(12) United States Patent
Kwon

(10) Patent No.: US 11,049,194 B2
(45) Date of Patent: Jun. 29, 2021

(54) IDENTIFYING AND ANALYZING VEHICLE REFUELING EVENTS

(71) Applicant: Honda Motor Co., Ltd., Tokyo (JP)

(72) Inventor: Do hyuk Kwon, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 16/181,199

(22) Filed: Nov. 5, 2018

(65) Prior Publication Data

US 2020/0143488 A1    May 7, 2020

(51) Int. Cl.
*G06Q 50/06* (2012.01)
*G06Q 30/02* (2012.01)
*G07C 5/00* (2006.01)

(52) U.S. Cl.
CPC ......... *G06Q 50/06* (2013.01); *G06Q 30/0206* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 6,968,325 B2 * | 11/2005 | Smith | ................ | G06Q 30/0225 235/381 |
| 7,938,321 B2 * | 5/2011 | Harrell | .................. | G07F 13/025 235/381 |
| 8,116,972 B2 * | 2/2012 | Klampfl | ............. | G01C 21/3679 701/123 |
| 8,799,182 B2 * | 8/2014 | Atkins | ................... | G06Q 10/04 705/400 |
| 8,928,473 B2 * | 1/2015 | Gilchrist | ................ | B60K 15/04 340/450.2 |
| 9,229,905 B1 * | 1/2016 | Penilla | .................. | H04L 67/306 |
| 9,754,301 B2 | 9/2017 | Park | | |
| 10,210,536 B1 * | 2/2019 | Wai | ..................... | G06Q 30/0246 |
| 2002/0046134 A1 * | 4/2002 | Egashira | ................ | G06Q 40/04 705/26.3 |
| 2007/0055568 A1 * | 3/2007 | Osborne | ............ | G06Q 30/0225 705/14.26 |
| 2008/0313014 A1 * | 12/2008 | Fell | ........................ | G06Q 30/02 705/400 |
| 2009/0024466 A1 * | 1/2009 | Shoemake | ............. | G06Q 30/00 705/14.38 |
| 2010/0023162 A1 * | 1/2010 | Gresak | .................. | G07F 13/025 700/241 |
| 2010/0306078 A1 * | 12/2010 | Hwang | .................. | G06Q 30/02 705/26.1 |
| 2011/0093305 A1 * | 4/2011 | Alexander | ....... | G06Q 10/06311 705/7.13 |
| 2012/0215601 A1 * | 8/2012 | McGuire | ................ | G06Q 30/06 705/14.13 |

(Continued)

FOREIGN PATENT DOCUMENTS

MX    344347 B    11/2016

*Primary Examiner* — Sujay Koneru
(74) *Attorney, Agent, or Firm* — American Honda Motor Co., Inc.; Aaron C. Fong

(57) ABSTRACT

The systems and methods provided herein are directed to a system for identifying and reporting partial refueling events. Fueling stations can evaluate when fuel prices may be negatively impacting revenue due to consumers choosing to not to fill their tanks. Stations may then make adjustments to fuel prices that are responsive to customer behavior.

4 Claims, 8 Drawing Sheets

| Date and Time | Tank before fueling | Tank after fueling | Underfill | Price per gallon | Purchase total | Price of fill | Price of fill at $.05 less | Price of fill at $.10 less |
|---|---|---|---|---|---|---|---|---|
| 03-05-2018, 14:37 | 3.1 gal | 8.8 gal | 3.5 gal | $2.859 | $16.30 | $26.31 | $25.85 | $25.39 |
| 03-05-2018, 15:44 | 4.2 gal | 6.5 gal | 6.0 gal | $2.859 | $6.58 | $23.73 | $23.32 | $22.90 |
| 03-05-2018, 15:48 | 2.0 gal | 5.2 gal | 7.7 gal | $2.859 | $9.15 | $31.17 | $30.62 | $30.08 |
| 03-05-2018, 16:05 | 4.8 gal | 16.5 gal | 0.2 gal | $2.859 | $23.16 | $34.03 | $33.43 | $32.84 |
| 03-05-2018, 17:29 | 4.0 gal | 5.0 gal | 10.1 gal | $2.859 | $2.86 | $31.74 | $31.18 | $30.63 |
| 03-05-2018, 17:31 | 0.8 gal | 2.8 gal | 9.3 gal | $2.859 | $5.72 | $32.31 | $31.75 | $31.18 |

(56) References Cited

U.S. PATENT DOCUMENTS

| | | | |
|---|---|---|---|
| 2013/0304544 A1* | 11/2013 | Gillis | G06Q 30/0206 705/7.34 |
| 2015/0081392 A1* | 3/2015 | Fox | G06Q 30/0206 705/7.35 |
| 2015/0213657 A1 | 7/2015 | Tanaka | |
| 2015/0242868 A1* | 8/2015 | Perelmutov | G01C 21/3679 705/7.34 |
| 2015/0276457 A1* | 10/2015 | Dudar | B60K 15/03 73/290 R |
| 2015/0316406 A1* | 11/2015 | Gale | G06Q 50/06 705/39 |
| 2015/0378381 A1* | 12/2015 | Tinnakornsrisuphap | F24F 11/30 700/276 |
| 2016/0005062 A1* | 1/2016 | Sonpal | G06Q 30/02 705/7.34 |
| 2016/0132916 A1* | 5/2016 | Rosenberg | G06Q 30/0206 705/7.31 |
| 2016/0210648 A1* | 7/2016 | Cirannek | G06Q 30/0206 |
| 2017/0098257 A1* | 4/2017 | Keller | G06Q 30/0283 |
| 2017/0228749 A1* | 8/2017 | Larvol | G06Q 10/1053 |
| 2017/0363432 A1* | 12/2017 | Hall | B67D 7/04 |
| 2019/0050918 A1* | 2/2019 | Pancheri | B67D 7/04 |
| 2019/0185312 A1* | 6/2019 | Bush | F16K 31/14 |
| 2019/0211973 A1* | 7/2019 | Knoche | F17C 13/023 |
| 2020/0065679 A1* | 2/2020 | Javeri | G01C 21/3469 |

* cited by examiner

*300*

| Anonymized ID *302* | Tank before fill *304* | Tank after fill *306* | Fuel purchased *308* | Tank size *310* |
|---|---|---|---|---|
| Vehicle A | 18% | 95% | 9.4 gal | 12.2 gal |
| Vehicle B | 15% | 35% | 3.2 gal | 16.0 gal |
| Vehicle A | 61% | 98% | 4.5 gal | 12.2 gal |
| Vehicle B | 30% | 88% | 9.2 gal | 15.8 gal |
| Vehicle C | 4% | 100% | 16.1 gal | 16.8 gal |
| Vehicle A | 42% | 92% | 6.1 gal | 12.2 gal |

Fig. 3

IDENTIFYING AND ANALYZING VEHICLE REFUELING EVENTS

BACKGROUND AND BRIEF DESCRIPTION

Observation and analysis of customer behavior allows business to optimize their operations to better attract and retain those customers. Gas stations must be especially sensitive to customer behavior because the majority of their products are considered highly commoditized (that is, customers do not recognize a significant difference between the quality of their product and that of their competitors) and the price of fuel fluctuates regularly. Determining the relationship between fuel price and customer behavior is therefore considered a valuable function of analytics in the retail fuel market.

One indication that fuel price may be too high is that customers pump a controlled amount of fuel into their vehicles rather than filling the tank. A pattern of limited refueling purchases rather than tank-filling purchases may signal that a fuel price is set too high, while a pattern of tank-filling purchases may signal that a fuel price is acceptable to customers.

The present disclosure describes methods and apparatus for monitoring whether, upon refueling a vehicle, the fuel level returns to full or to only partially filled. Analysis can then be made of data collected on this customer behavior in order to determine if a change should be made at the fueling station.

According to one embodiment, a computer-implemented method is described for monitoring and reporting a refueling event in a vehicle. The steps of the method can include determining a first and second fuel levels within a vehicle at different times; identifying a refueling event based on the change, and transmitting data representing the identified refueling event to a location external to the vehicle. The transmitted data includes at least the new fuel level.

In one embodiment, the vehicle was deactivated between the time at which the first fuel level was determined and the time at which the second fuel level was determined. The refueling event is associated with this time.

In one embodiment, the method also includes determining and transmitting the location of the vehicle.

In one embodiment, the identifying the refueling event also includes detecting operation of a hatch for accessing a vehicle fuel tank.

In one embodiment, the method also includes later transmitting additional data for a different refueling event. The two sets of data have a common identifier to denote that the events happened to the same vehicle.

In one embodiment, the first fuel level is also included in the transmitted data. The transmitted data indicating the first and second fuel levels includes either units of volume, fractions of a full tank, or percentage values of a full tank. Travel information for the vehicle, including an origin or destination location for the trip where the refueling event occurred, can also be transmitted.

In some aspects of an exemplary embodiment, a computer implemented method is disclosed for receiving and analyzing refueling event data. The method includes the steps of receiving data associated with a refueling event that indicates a fuel level for a vehicle; determining whether the refueling event represented a full or partial refueling event; determining a listed fuel price associated with the refueling event; and adjusting a fueling station's listed fuel price.

In one embodiment, the received data indicates a time and a location of the refueling event. Determining a listed fuel price associated with the refueling event can comprise referencing a record of fuel price listings to identify the fuel price associated with the indicated time and location.

In one embodiment, determining the listed fuel price further includes identifying a particular transaction from a record of a plurality of transactions based on matching the received data with the particular transaction.

In one embodiment, the steps can also include determining a volume of fuel under-fill associated with the refueling event; and determining, based on the refueling event listed fuel price and the volume of fuel under-fill, a lost revenue amount associated with the refueling event.

In one embodiment, the steps can also include determining a hypothetical revenue amount based applying the adjusted fuel price to a refueling event in which the vehicle is refueled to capacity. Adjusting the fuel station's list price can be based on analyzing at least one of the lost revenue amount and the hypothetical revenue amount.

According to one exemplary embodiment, a method for receiving and transmitting refueling event data is described. The method includes receiving and recording information associated with a first and second refueling events from a first and second vehicles; and then, in response to first and second requests for refueling event information, respectively serving data that includes the first refueling event but not the second refueling event, and vice versa.

In one embodiment, the first and second requests are associated with different fueling stations. The data served in response to the first request is based on identifying the first refueling event as being associated with a first fueling station, and likewise for the second refueling event and a second fueling station. In one aspect, the first request originates at the first fueling station.

In one embodiment, the method further includes receiving and recording information associated with a third refueling event associated with a third fueling station. The data served in response to the first request can include the third refueling event, based on identifying a relationship between the first fueling station and the third fueling station. In one aspect, the identified relationship can be geographic proximity of the two fueling stations. In another aspect, the identified relationship can be the same business entity being associated with both fueling stations.

In one embodiment, the data served in response to the first request includes one or more other recorded refueling events associated with the first vehicle. In one aspect, the data served in response to the first request can include data representing the make, model, and fuel capacity of the first vehicle.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 3 shows a data table of refueling events associated with particular vehicles in accordance with one aspect of the present disclosure;

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to recording the refueling behavior of a vehicle operator at a fueling station, in order provide data that can be used to optimize fuel prices or other responses to the customer behavior.

Ideally, a vehicle operator requiring fuel can respond to an observed price of a nearby fueling station in one of three ways. First, the operator can bypass the station, purchasing no fuel. Second the operator can patronize the station and fill the automobile's tank. Third, the operator can patronize the station but only partially fill the vehicle's tank.

The transaction data available to a fuel station allows it to count how many customers purchased fuel over a given window of time associated with a particular fuel price, and how much fuel each customer purchased. However, because there is significant variation in the fuel level at which different operators refuel, the purchase amount may not directly correlate to whether or not any particular consumer is filling their vehicle tank. Under some of the exemplary analyses described in the present disclosure, each partial refueling event should be identified as loss of revenue relative to a full refueling event. A station would ideally optimize its fuel price such that more customers would choose to fully refuel.

Figure 1:
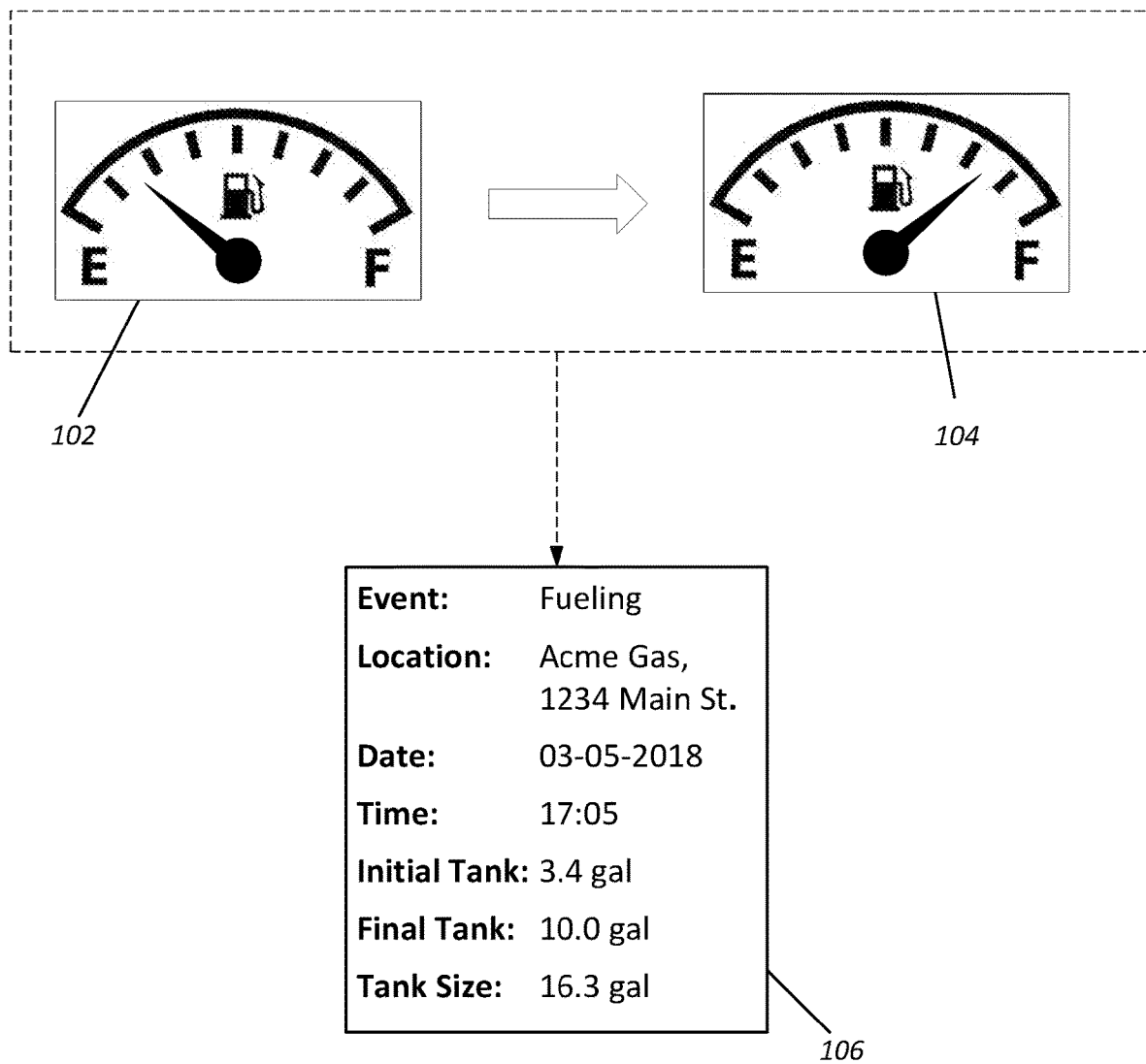
FIG. 1 is an illustration of a refueling event and resulting event record in accordance with one aspect of the present disclosure.

FIG. 1 illustrates a refueling event, represented symbolically by a first fuel gage reading 102 transitioning to a second fuel gage reading 104. One of ordinary skill in the art will recognize that a variety of mechanisms exist in order to measure the fuel level within a vehicle tank, including measuring the resistance in a circuit formed by a float element and the side of the tank. In some implementations, the physical gauge reading may reflect a digital value that is recorded as the actual fuel level measurement.

As shown in FIG. 1, the refueling event may prompt the creation of an event record 106 by a controller in electrical communication with the refueled vehicle. The controller may be an integrated system controller associated with the vehicle itself, or may be a separate system installed to monitor components of the vehicle. One of ordinary skill will recognize that existing computing systems for recording fuel use and mileage information, such as trip computers configured to calculate the average miles per gallon (or "MPG") rating under various operating conditions, may already record and store some or all of the data necessary to create the record 106.

The record 106 includes the time and location of the refueling event, which in some implementations may be used to report the refueling event to the fueling station associated with the recorded location. The most recent fuel gage reading taken by the vehicle system prior to the refueling event is recorded, along with the first fuel gauge reading taken following the refueling event. Other information may also be recorded in some implementations; for example, the duration of time between the two gauge measurements may be included in an event record. Information about the origin and/or destination points of the trip during which the refueling event happened, the general direction of travel of the vehicle on the trip (for example, whether the vehicle was travelling northbound or southbound on a major highway near the station), anonymized demographic information of the vehicle operator, or other relevant data may potentially be included in the event record.

The record 106 may also include the tank size associated with the vehicle. Tank size may be included in a variety of ways. For example, a particular model of vehicle usually has a uniform tank size. In some implementations, a record 106 designate a vehicle model, which can be used with a look-up table of tank sizes in order to determine the volume of the tank. In some implementations, the volume of the tank may be included directly with the record. In some implementations, as further described below, rather than having fuel volume quantities for the initial and final fuel levels, the vehicle system may record a percentage or fraction of the tank that is full; this method of measuring the fuel levels implicitly records the size of the tank relative to these values, as a full tank is understood to be at 100% or a ratio of 1.

Figure 2:
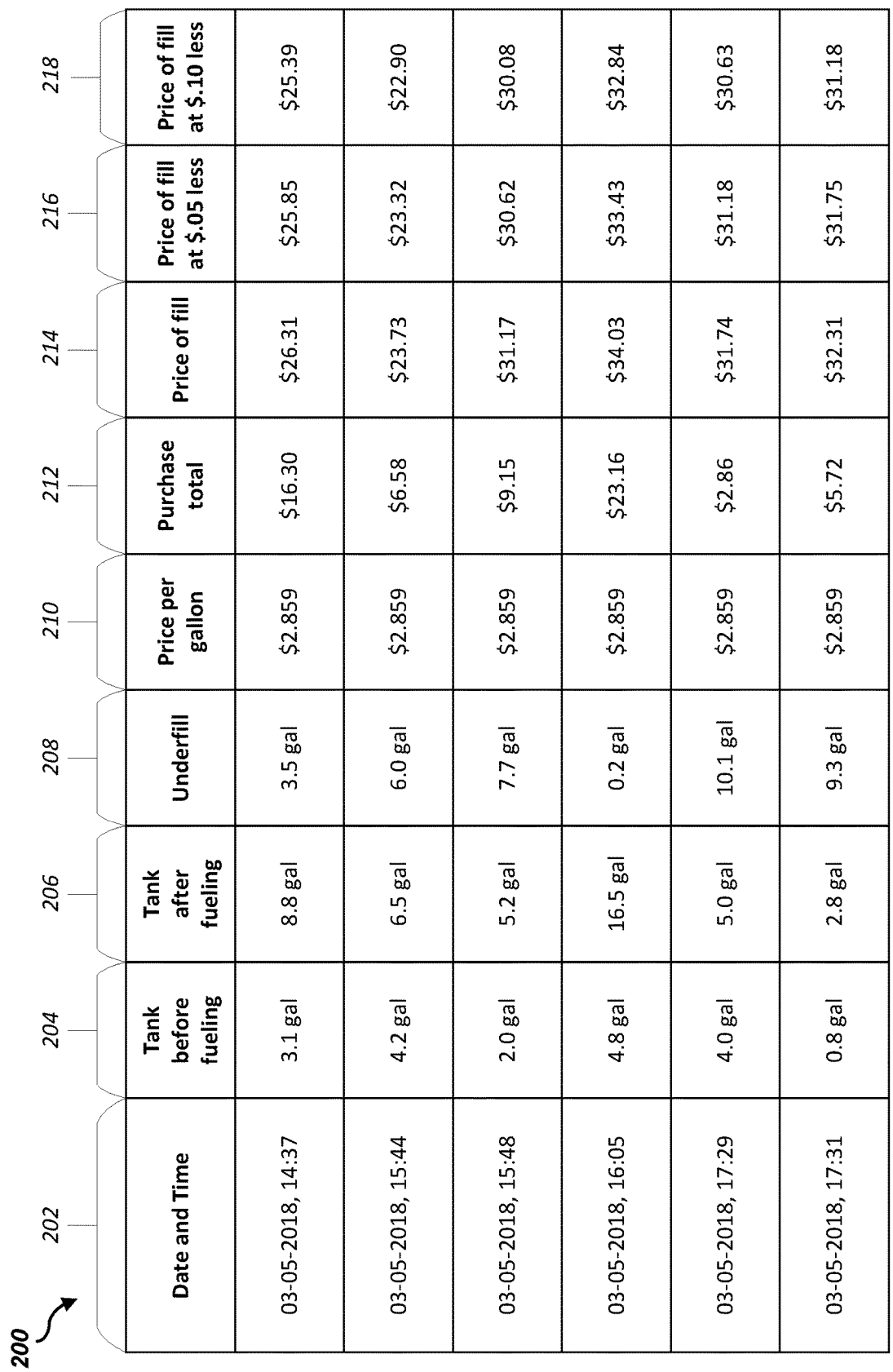
FIG. 2 shows a data table of station refueling events along with actual and calculated revenue data in accordance with one aspect of the present disclosure.

FIG. 2 is a table 200 illustrating several received event records associated with a particular fueling station over an exemplary interval of time. In this example, the identity of the customer or the automobile is not included in the recorded data. Instead, four pieces of information are received from each participating vehicle system associated with a refueling event: the date and time of the refueling (column 202), the initial tank level before refueling (column 204), the final tank level after refueling (206), and the "underfill," defined as the difference between the final tank level and a full tank (column 208).

In various implementations of the methods disclosed herein, different data may have been provided to the fueling station system by various vehicle systems, which is then translated into the listed data. Using the example of the record 106 of FIG. 1, a tank size is listed rather than an underfill amount. The system can record an underfill U by subtracting the final fuel level volume $V_f$ from the listed tank volume $V_t$ as shown in Equation 1:

$$U = V_i - V_f \qquad (1)$$

In some implementations, the date and time is also not included in data received by the vehicle system but instead is associated with the refueling event based on the time it is communicated to the fueling station system. Alternatively, the fueling station system may match received data to a transaction recorded by a device associated with the fueling station (such as, for example, finding a purchase of fuel with approximately the same volume as the communicated refueling event).

The remaining five columns 210-218 represent data and calculations by the fueling station system, which may be used to evaluate whether a price point for fuel should be modified. A price per gallon is associated with each refueling event (210). This may be done, for example, by comparing the date and time of the transaction with the listed fuel prices during that period of time. Where multiple fuel types with different prices are provided at the station, the fueling station system's transaction records may be queried to determine which grade of fuel was purchased during each refueling event.

The total amount spent on the fuel purchase is associated with each refueling event (212). The system can, in some implementations, derive this price $P_{actual}$ from the transaction's price per gallon $P_{gal}$ and fuel level volumes before and after the refueling event $V_i$ and $V_f$ as follows:

$$P_{actual} = P_{gal} * (V_f - V_i) \qquad (2)$$

Alternatively, the fuel purchase amount may be received from the fueling station system's transaction data, or from data received from the vehicle system or a third party system associated with the disclosed procedures.

For comparison against the actual amount spent on fuel, the system calculates a hypothetical price that the customer would have paid had they filled the tank completely rather than partially. In evaluating whether to lower the price to encourage the customer to fill their tank, the system may calculate not only the total spend at the refueling event's price per gallon (column 214) but also the spend if the price per gallon were five or ten cents lower (columns 216 and 218, respectively). The values of five and ten cents for comparison are exemplary; in some implementations, the appropriate prices with which to compare may be selected by the system or by a user of the system according to what evaluative data provides the best basis for decision-making and analysis.

In some implementations, the system may be configured to recategorize refueling events wherein the underfill is below a certain threshold, such as 2.0 gallons. From the table 200, one refueling event that occurred at 16:05 involved an 12.1 gallon purchase, leaving only 0.2 gallons of the tank empty. This could be viewed, in some embodiments, as filling the tank, the small underfill representing a measurement error either in the final fuel level or in the tank size. Unlike the partial refueling events comprising the rest of the entries on the table 200, this and other full refueling events are characterized that lowering the price per gallon of fuel would cause the spending to go down (in this example, from $33.46 to $33.43 or $32.84).

In some cases, the signals received from a vehicle system regarding the fuel levels before and after a refueling event may not be expressed in gallons, but may instead be expressed as a ratio, fraction, or percentage of the total volume of the tank. FIG. 3 shows a table 300 in which refueling events are recorded over time and used to estimate the total size of the tank. In some implementations, each event may be associated with a known vehicle, but that vehicle's records may be kept under an anonymized identification such as a serial number in order to maintain customer privacy (column 302). In the example of FIG. 3, the recorded information provided to a fueling station system includes the initial and final fuel levels in a vehicle tank surrounding a refueling event (columns 304 and 306), but in the form of the percentage of the tank that is full in each case. The fueling station system may then associate this data with a transaction recorded in its system, and associate the amount of fuel purchased during each refueling event (column 308) to the received fuel level readings. The tank size $V_f$ associated with each of these refueling events can be calculated from the initial and final readings $n_i$ and $n_f$ in combination with the amount of fuel purchased $V_p$:

$$V_f = V_p / (n_f - n_i) \qquad (3)$$

Where the same vehicle is identified over multiple transactions, such as Vehicles A and B in the table 300, an estimated tank size may be based on a weighted average of the calculations made from the different refueling events. In some implementations, the tank size estimates made from these calculations may be compared to other data, such as known tank sizes of a vehicle model or a tank size reported by a vehicle system.

While the example above describes volume of fuel, analogous capacity data and calculations can occur for any vehicle energy source. For example, in an electric or hybrid vehicle for which a electric charging station is used, the capacitance of the vehicle battery can be monitored in the place of a vehicle fuel level. The maximum capacitance of the battery is used in place of the tank capacity, and a partial recharging of the battery to a capacitance significantly less than the battery's maximum capacitance analogizes to a partial refueling event.

When a source other than conventional fuel is used, different factors may impact a customer's decision whether to fill partially or fully. For example, electric charging stations can take significantly more time to recharge a battery than would normally be required to refuel a gasoline tank (or other liquid fuel tank). Some partial recharging events for electric vehicles may be motivated by the speed of charging versus the time constraints of the customer. However, analogous factors such as the costs of electricity (often expressed in dollars per KWh or the like) may also influence the customer to recharge partially or fully, just as with fuel expressed in volume.

Figure 4:
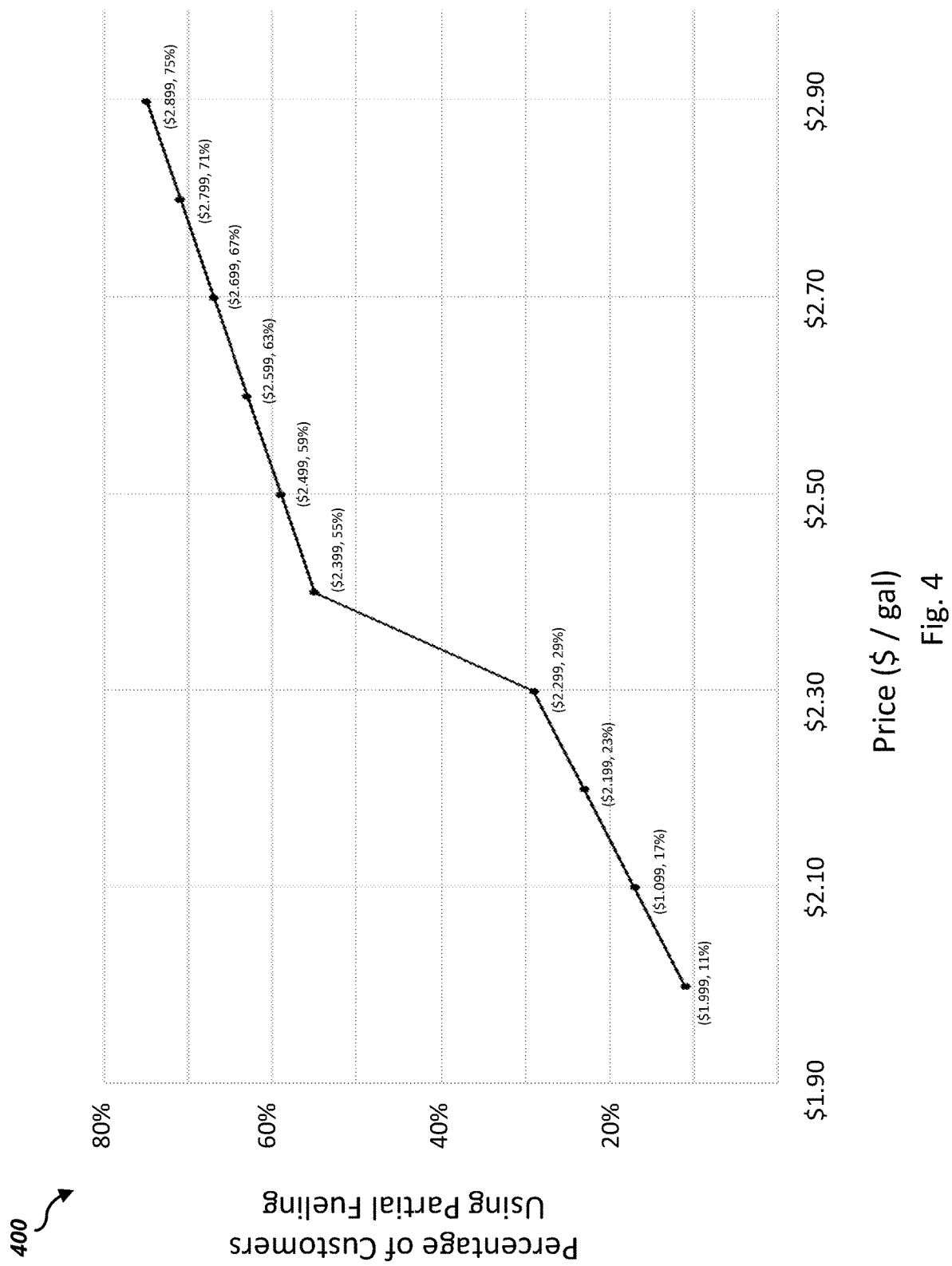
FIG. 4 is a graph correlating fuel price with customer refueling behavior in accordance with one aspect of the present disclosure.

Analysis of the data may occur in a variety of forms. In one implementation, a system may be configured to determine a relationship between the price of fuel at a given fueling station and the number of customers that choose partial refueling at that station. The graph 400 of FIG. 4 illustrates one such relationship.

The graph 400 shows the average percentage of customers that make a fuel purchase identified as partial refueling by the system under methods disclosed herein. The points on the graph represent aggregated customer behavior at fuel prices between $1.999 and $2.899 per gallon, in ten cent intervals. Partial refueling by customers increases as the price per gallon increases. However, the jump between $2.299 per gallon and $2.399 per gallon reflects a much larger jump than any other on the graph, from 29% of customers partially refueling to 55% of customers. In some implementations of the present invention, an automated pricing mechanism may respond to this data by holding a rising fuel price at $2.299 for longer than usual in order to optimize profits for the station at that point. Similarly, an automated pricing mechanism taking this data into consideration might accelerate a falling fuel price past $2.399 toward $2.299 in order to take advantage of the increased rate of tank filling behavior at that price point.

Figure 5:
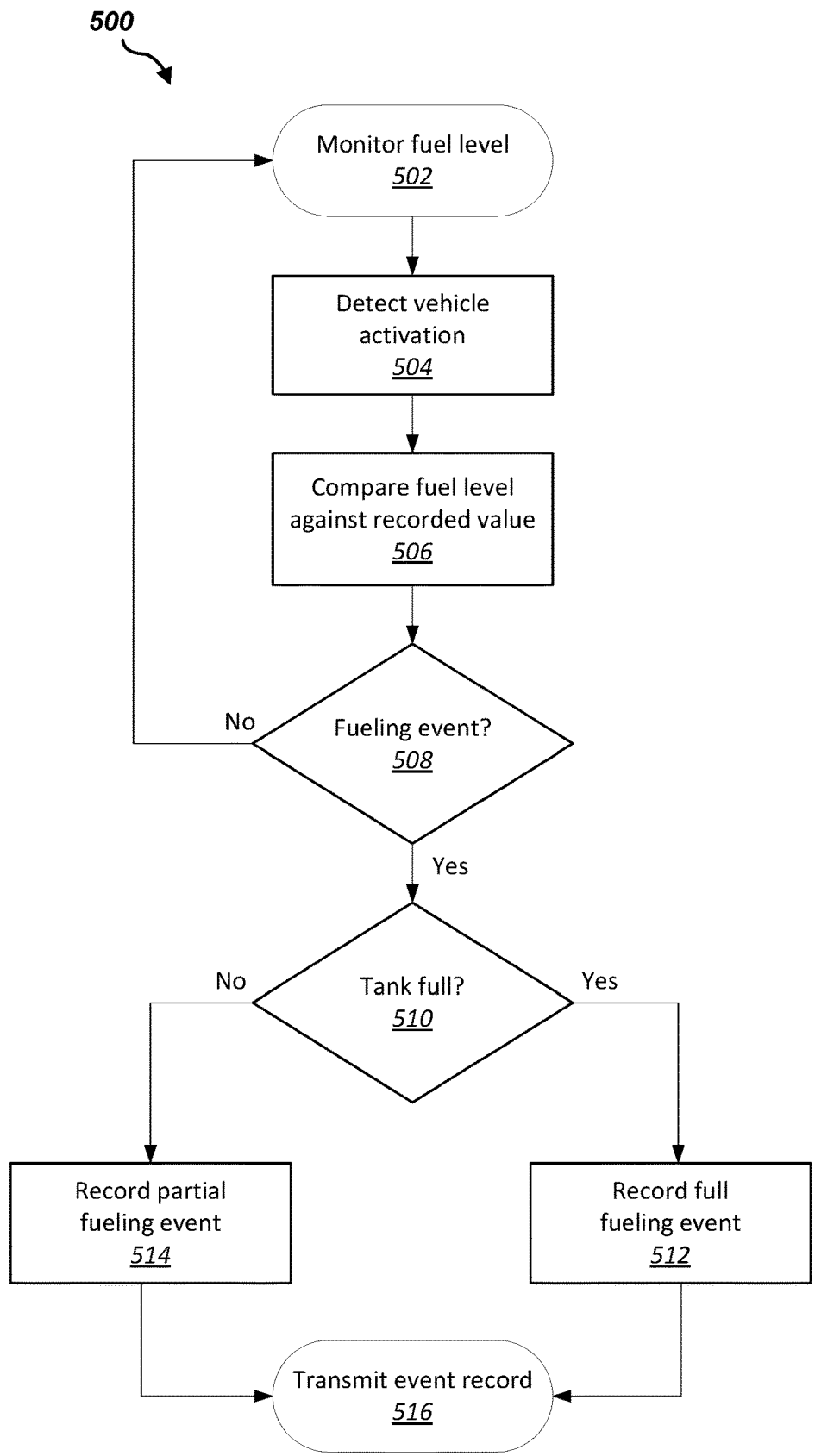
FIG. 5 is a flowchart illustrating a vehicle controller method for identifying and reporting refueling events in accordance with one aspect of the present disclosure.

The flowchart of FIG. 5 illustrates a process 500 by which a vehicle can detect and report a refueling event. A vehicle may monitor its fuel level by any electronic or mechanical means known in the art (step 502). In some implementations, the fuel level of a vehicle may be recorded in non-volatile memory that can survive the vehicle system being deactivated and reactivated, such that the vehicle can detect a change in fuel level between the time it is turned off and the time it is turned back on.

As illustrated in the flowchart of FIG. 5, when a vehicle system detects that the vehicle has been turned back on (504), it may respond by comparing a recorded value of the fuel level, taken when the vehicle was last activated, and the present value.

The vehicle system may evaluate the past and present fuel level values to determine whether there has been a refueling event (508). In some implementations, only a significant change in fuel that exceeds a threshold difference may be detected as a refueling event. Minor fluctuations in the measured fuel, such as those attributable to inaccuracies in the method of measurement or in volume changes due to temperature shifts, are ignored and not reported as refueling events. In some implementations, a negative change (that is, where the current fuel level is lower than the recorded level) may never be reported as a refueling event, since a refueling event should not result in there being less fuel in the tank.

While the flowchart of FIG. 5 describes the detection of a refueling event based on a change in fuel level that occurs while a vehicle is inactive, it will be understood that some refueling events may occur while a vehicle is active. In some implementations, the vehicle system may check the fuel level of the vehicle periodically and make the described comparisons even while the vehicle is active, thus detecting a refueling event that occurs under those conditions.

In some implementations, a fuel level comparison may only occur when the system detects some other indication of a refueling event. For example, a comparison may only occur when the access hatch to the vehicle's fuel tank has been accessed. In some embodiments, the system may detect the proximity of a fuel pump or determine that the vehicle's location corresponds with a fueling station, and so make a fuel level comparison either periodically while the vehicle remains in the relevant location or immediately after the vehicle leaves the relevant location.

Once the refueling event is identified ("yes" on decision 508), the system determines whether the tank is now full (510). This may involve, in some implementations, comparing the most recently measured fuel level against a reference level for the vehicle's fuel tank. The reference level may be periodically calibrated by noting the measurements given when the system has reason to believe the tank is full, or by interaction with a technician at scheduled maintenance intervals.

If the tank is determined to be full ("yes" on decision 510), the system records a full refueling event (step 512). In some implementations, the information collected for a full refueling event may be reduced relative to the information collected for a partial refueling event (step 514). For example, data associated with the under-fill amount and the total amount of gas purchased may be included in the partial refueling event record, while that information may not be included for a full refueling event.

Once made, the refueling event record is transmitted from the vehicle to a remote system configured to analyze refueling event data (step 516). In some implementations, the record may be transmitted as soon as the event is recorded. In some implementations, records of refueling events may be transmitted at a later time, either periodically or based on a recognized opportunity to easily transmit data (such as proximity to a short-range local network). Supplemental data, such as a time stamp and location for the event, may be included in situations where the record may not be transmitted at the time and place that the refueling event occurs.

Figure 6:
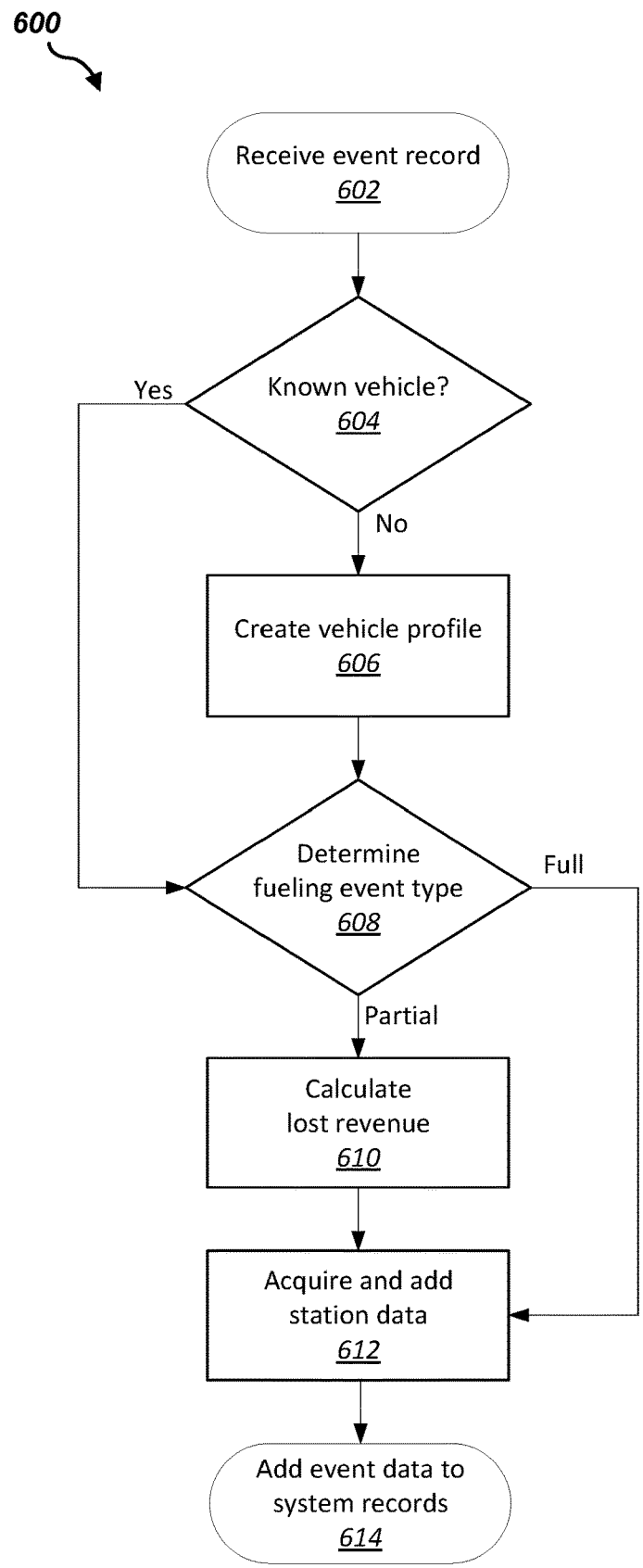
FIG. 6 is a flowchart illustrating a fueling station system method for receiving and analyzing refueling event data in accordance with one aspect of the present disclosure.

FIG. 6 illustrates a method 600 by which an event record may be analyzed by a system associated with one or more fueling stations. An event record is received (step 602), either directly from a vehicle or indirectly from another system in communication with a vehicle. The system receiving the record may also, in some implementations, associate the refueling event record with a vehicle, which may be identified with information supplied by the vehicle itself, by devices associated with the fueling station, or by other information sources where possible. If necessary ("no" on decision 604), the system may create a new vehicle profile in order to associate each event record with a vehicle (step 606).

As noted above with respect to the creation of the refueling event record by the vehicle system, a refueling event type (that is, whether the refueling is considered full or partial) is determined (decision 608). In some implementations, this information may come directly from the received refueling event record, while in other implementations the system may have to determine this from other available data (such as, for example, the amount of gas in the tank at the end of the refueling event and a known capacity for the vehicle's tank).

Supplemental calculations may be carried out when it is determined that a partial refueling event occurred (step 610). These calculations may include determining differences in revenue between the partial refueling and a hypothetical full refueling, as described above with respect to FIG. 2 and the table 200.

In some implementations, the event record may include not only data transmitted from a vehicle system but also data supplied by supplemental systems (step 612). For example, where a short-range receiver associated with a particular fueling station receives data from the vehicle and transmits it to a fueling station system, it may first supply data associated with the status of the fueling station (such as the current list prices of fuel or data regarding the refueling event transaction as recorded by station devices such as the fuel pump.)

All of this information may be added to records associated with a fueling station or with a broader fuel price analysis system (step 614). The information may then be used to adjust fueling station prices or other parameters.

Figure 7:
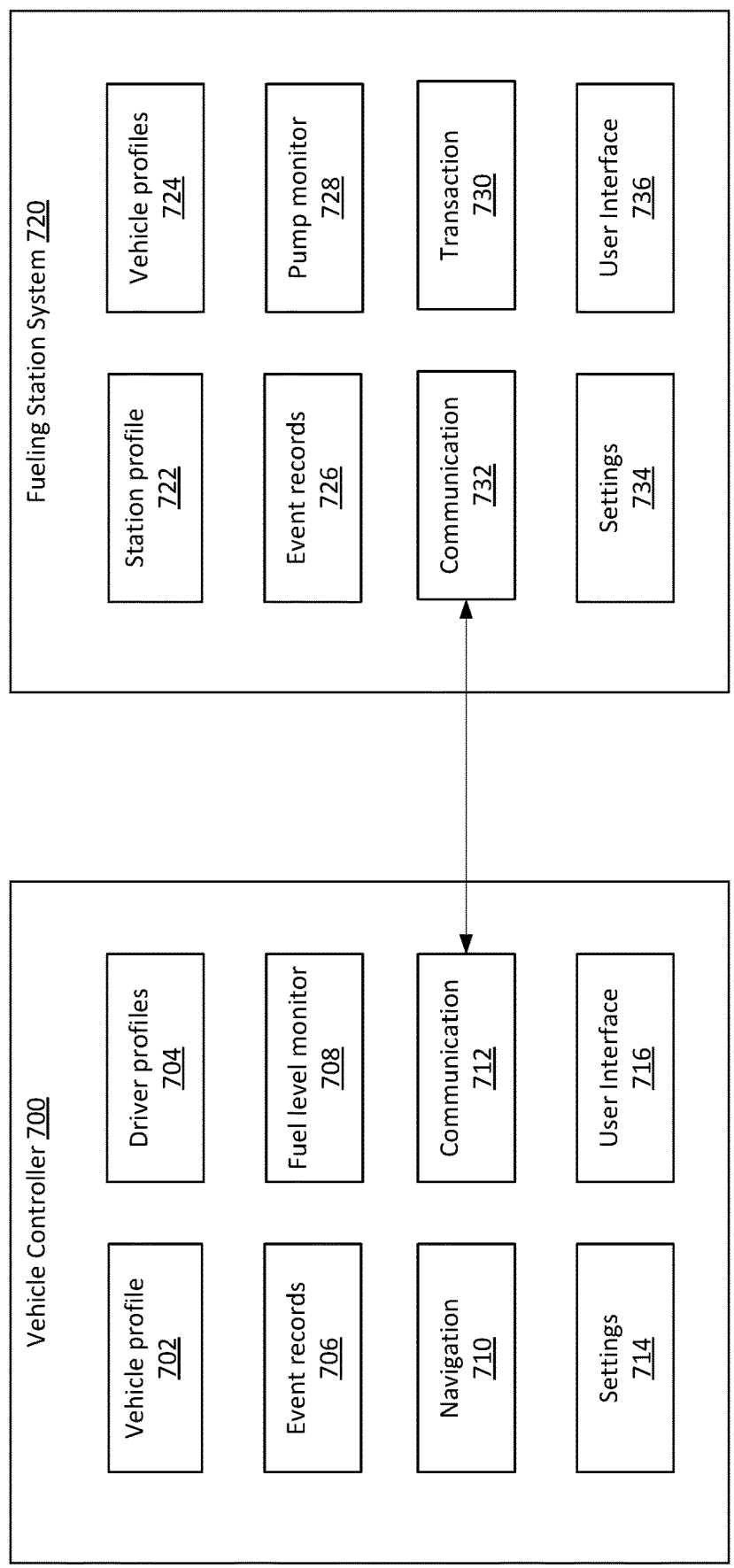
FIG. 7 is a schematic of a vehicle controller in communication with a fueling station system in accordance with one aspect of the present disclosure.

A schematic of the components of an exemplary vehicle system controller 700 embodying aspects of the present disclosure is illustrated in FIG. 7. The controller 700 may, in different embodiments, represent one or more components or modules of a larger computing system, or may represent one or more standalone devices configured to control functions of a vehicle. One of ordinary skill will recognize that the elements described with respect to the controller 700 and with respect to the fuel station 720 may be distributed across a network or other extended architecture as is conventionally known in the art.

The vehicle controller 700 may include a vehicle profile 702 that includes information associated with the vehicle. In some implementations, this may include a year, make, and model of the vehicle. Fueling information, such as the capacity of the fuel tank and what types and grades of fuel are appropriate for the vehicle, may also be included. In some implementations, a vehicle profile 702 may include information determined from monitoring the operation of the vehicle, such as its fuel efficiency, how many miles it has travelled, when it has received maintenance, and what road and/or weather conditions the vehicle typically encounters.

The vehicle controller 700 may further record and store information about one or more drivers associated with the vehicle. Each such driver profile 704 may include data on a particular driver's refueling preferences, such as at which fuel stations the driver most often stops and at what fuel levels the driver is most likely to refuel. In some implementations, driver identity and/or profile information may be shared with third party servers and/or gas stations; in other implementations, driver profile information may be maintained by the vehicle as private, and only shared in a generic or anonymized form.

As described above, the controller 700 may store event records 706 representing data that may be reported externally under appropriate circumstances. When the controller 700 detects a refueling event, all data required to create the record 706 may be acquired and processed into a standardized form appropriate for storing as the record 706. Information may, for example, be received from a fuel level monitor 708 that measures and reports the fuel level for a vehicle fuel tank. The controller 700 may, in creating the event record 706, also take data from the vehicle profile 702 and one or more of the driver profiles 704.

As another example, the vehicle controller 700 may acquire data from a vehicle navigation module 710. The navigation module 710 may include GPS and other telemetry data, as well as a database of points of interest associated with locations, data representing roads and other mapping features, and position records representing a history of the vehicle's travels. In some implementations, the navigation module 710 may identify the proximity of a fueling station, and may provide contact information to allow the vehicle controller 700 to provide certain information to systems associated with that station as herein described.

The vehicle controller 700 further includes a communication module 712 that provides communication between vehicle systems and external systems. As shown in FIG. 7, the communication module 712 can facilitate communication between the vehicle controller 700 and a fueling station system 720 as further described below. The communication module 712 may include means for controlling and using a variety of different communication technology, including short-, mid-, and long-band radio transmitters and receivers, near-field communication technology, optical communication technology, and other protocols and apparatus known in the art. While shown in FIG. 7 as a single module 712, it will be understood that any number of integral and/or autonomous systems and controllers may be involved in vehicle communication. In some implementations, the controller 700 may have direct control over some communication channels but may have to send instructions to other vehicle devices to use certain communication channels only indirectly.

The vehicle controller 700 may also have a settings module 714 that modifies controller processes based on driver preferences. In some implementations, the settings module 714 may have default settings that are only changed if a driver seeks out and changes them, such as by utilizing a user interface 716 associated with the vehicle systems. In other implementations, the settings module 714 may be configured to adapt by interpreting driver behavior as expressing driver preferences, even if the preference is not explicitly given to the system. For example, the settings module 714 may recognize that the driver has repeatedly reduced the guidance voice associated with the navigation module 710 from its default level to a lower volume. The settings module 714 may therefore lower a default guidance volume setting such that the initial guidance volume is reduced when the system is used in the future.

The vehicle controller 700 may, in some implementations, customize the information sent to a fueling station system 720 based on one or more settings 714 that are configurable by a driver. For example, refueling event data may only be transmitted at all if a driver "opts in" to allowing their data to be shared. The driver may be able to configure which information is shared, such as whether to allow the vehicle to be associated with an anonymized ID to track the same vehicle's behavior over time. The driver may be able to configure whether information about the type and configuration of the vehicle are shared, as well as the specifics of a refueling event and the amount of under-fill.

Under the appropriate circumstances, an event record may be shared with a fueling station system 720. In some implementations, the system 720 may be disposed on-site at a particular fueling station or may be off-site but still associated with a particular fueling station. In other examples, a system with some or all of the features described with respect to the fueling station system 720 may be administered centrally or by a third party, and may monitor and aggregate data representing more than one fueling station.

The station system 720 may include a station profile 722 storing data involving the particular station where the refueling event occurred. The station profile 722 may include, for example, the location of the station, its branding, which products and services it makes available to customers, station personnel data, and historical trends involving pricing and customer behavior.

The station system 720 may include a plurality of vehicle profiles 724, each of which includes records of the refueling behavior associated with a particular vehicle. In place of, or in addition to, vehicle profiles 724, the system 720 may associate recorded events with particular customers, such as by tracking loyalty cards or identifiable payment methods. A profile 724 may include data on vehicle type, which stations are frequented, and generalized refueling behavior.

The fueling station system 720 may acquire and store data on refueling events in the form of event records 726, like the example provided in FIG. 2 and described in detail above. In some implementations, the system 720 may associate data received from fuel station devices with the data received from a vehicle involving a refueling event. For example, the system 720 may include or communicate with a pump monitor 728 which provides point of sale information regarding the refueling transactions made at each station fuel pump. The system may further record transaction data 730, such as at a cash register or other payment location, and may associate transaction data with related event records 726 and/or vehicle profiles 724. It will be recognized that consumer sales behavior, such as the presence of supplemental purchases of consumer goods at a fueling station, may be tracked and correlated with refueling behavior and used to optimize the configuration and offerings of the fueling station.

The system 720 may receive event data from a vehicle controller 700 directly or through an intermediary. In some implementations, the system 720 may include a communication module 732, which may for example be an internet connection associated with one or more station controllers. The communication module 732 could, in some implementations, include a short-range radio or near-field communication means that could allow devices as the fueling station to communicate directly with a vehicle controller 700, such as by a Bluetooth® or other local protocol.

In some implementations, a station system 720 may have a settings module 734 that allows users (e.g. fueling station management, personnel, third party service providers, or analysts) to customize what data is received and stored for a particular fueling station. The system 720 may communicate with its authorized users through any appropriate user interface 736, which in some embodiments may be a dashboard web client or other internet-enabled interface.

Figure 8:
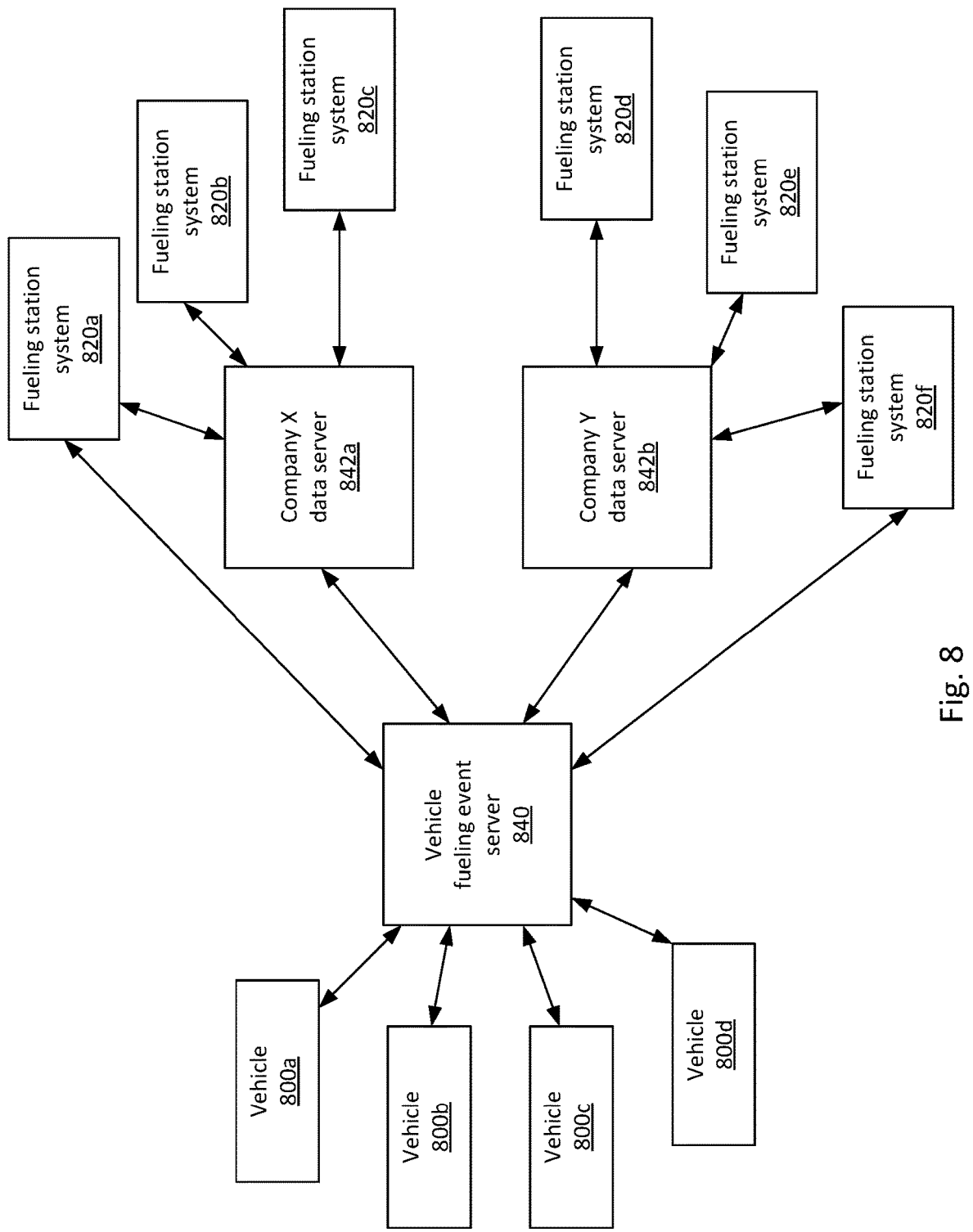
FIG. 8 is a schematic illustrating network architecture for refueling event monitoring in accordance with one aspect of the present disclosure.

FIG. 8 is a schematic illustrating network architecture for refueling event monitoring using a centralized server 840. As shown, the server 840 is in communication with each of multiple vehicles 800*a-d*. It will be recognized that the server 840 may take advantage of known systems for communication between a vehicle controller and a centralized server; for example, some automobile manufacturers include automatic update services for ensuring that the integrated automotive computers reflect any necessary patches or upgrades. A centralized server 840 for monitoring refueling events may use the existing architecture where possible. In other implementations, a centralized server 840 may be run by a third party, which may communicate either directly with a vehicle controller or with some other monitoring device included within the vehicle 800.

The data collected by the centralized server 840 may, in some implementations, be provided as a product or service offering to a company owning multiple fueling stations. FIG. 8 illustrates central data servers 842*a,b* managed by Company X and Company Y, respectively. In some implementations, each company may only receive data associated with transactions that are determined to have occurred at fuel stations affiliated with them. Alternatively, the vehicle refueling event server 840 may provide any data that a particular company might find relevant to its analysis; for example, it may provide aggregated partial fueling rates or average transaction totals within a certain geographic area, whether those came from the fuel stations affiliated with the particular company or not.

In some implementations, a vehicle refueling event server 840 may be able to take steps to protect the privacy of its customers through its handling of refueling event data. For example, the server 840 might anonymize each data record before reporting it to any other party. Data may be adjusted, summarized, redacted, or aggregated as necessary to protect personally identifiable information.

In addition to communicating refueling event data to data servers 842*a,b*, fuel station systems may be able to request data from a centralized server directly. FIG. 8, for example, illustrates fueling station system 820*a* associated with Company X and fueling station system 820*f* associated with Company Y each also in direct communication with the vehicle refueling event server 840. This communication, like the communication between data servers, may occur in both directions; for example, the refueling event server 840 may receive transaction data from a fueling station system server 820*a,f* that the server may then associate with particular refueling events that it has recorded.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for optimizing fueling prices for a fueling station, comprising:

automatically receiving data associated with refueling events from a plurality of vehicles at the fueling station through fuel level measurements on the plurality of vehicles, wherein the fuel level measurements are taken by gauges on the vehicles and provided to the fueling station, the fuel level measurements taken by measuring a resistance in a circuit formed by a float element and a side of a tank within the vehicles;

creating event records from the data associated with the refueling events, wherein the event records include a percentage of the tank that is full within the vehicles using the fuel level measurements and date and time of refueling;

determining, at the fueling station and based on the event records, whether the refueling events represented a full refueling event or partial refueling event by comparing measured fuel levels against the tanks within the vehicles;

retrieving a listed fuel price associated with the refueling events at the fueling station for the date and time of refueling; and automatically decreasing the listed fuel price at the fueling station when a percentage of vehicles from the plurality of vehicles make fuel purchases identified as partial refueling events indicating that the listed fuel price for the fueling station at a time of the refueling events is set above an acceptable purchase price.

2. The computer-implemented method for optimizing fuel prices for a fueling station of claim 1, wherein automatically retrieving the listed fuel price further includes identifying a particular transaction from a record of a plurality of transactions based on matching the received data with the particular transaction.

3. The computer-implemented method for optimizing fuel prices for a fueling station of claim 1, further comprising:

determining a volume of fuel under-fill associated with the refueling events; and determining, based on the refueling events listed fuel price and the volume of fuel under-fill, a lost revenue amount associated with the refueling event.

4. The computer-implemented method for optimizing fuel prices for a fueling station of claim 3, further comprising:

determining a hypothetical revenue amount applying the decreased listed fuel price to a refueling event in which the vehicle is refueled to capacity;

wherein decreasing the listed price at the fueling station is based on analyzing at least one of the lost revenue amount and the hypothetical revenue amount.

* * * * *